Feb. 7, 1933. LE ROY S. SMITHERS 1,896,255
SCALES
Filed Sept. 10, 1929    2 Sheets-Sheet 1
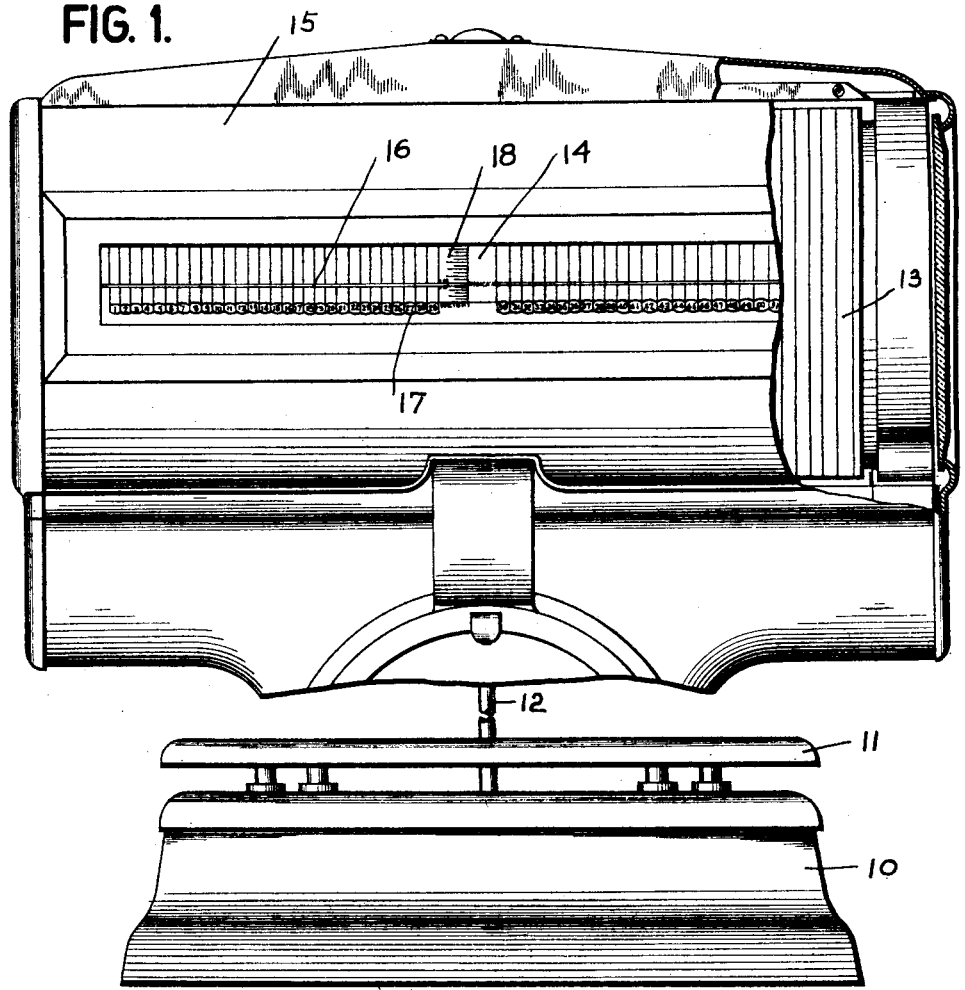
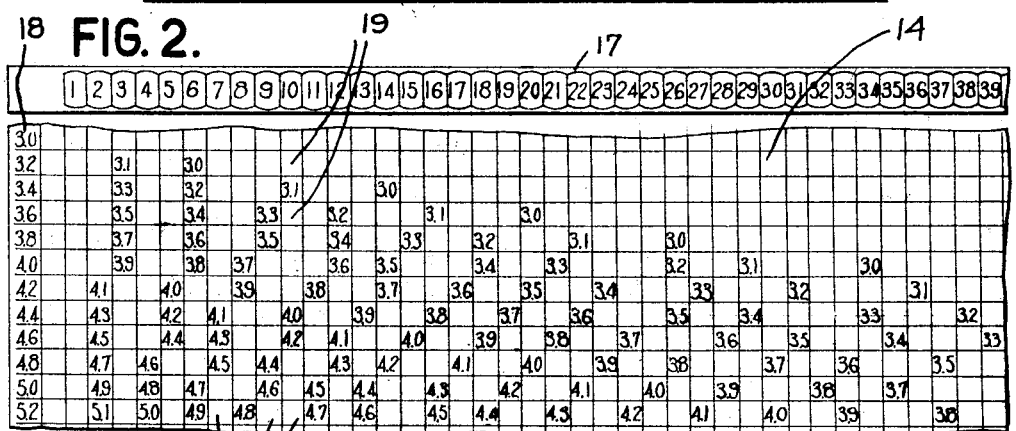
Inventor Leroy S. Smithers
By his Attorney A C Maby Feb. 7, 1933.   LE ROY S. SMITHERS   1,896,255
SCALES
Filed Sept. 10, 1929   2 Sheets-Sheet 2

Inventor
Leroy S. Smithers
By his Attorney
A.C. Maby

Patented Feb. 7, 1933

1,896,255

UNITED STATES PATENT OFFICE

LE ROY S. SMITHERS, OF WOODHAVEN, NEW YORK, ASSIGNOR TO DAYTON SCALE COMPANY, OF DAYTON, OHIO, A CORPORATION OF NEW JERSEY

SCALES

Application filed September 10, 1929. Serial No. 391,668.

This invention relates to weighing scales and has for its object the provision of a scale capable of furnishing percentage increase or decrease in weight of a material before and after certain operations have been performed upon it.

In the artificial silk industry for example, the raw material is dipped in a bath of chemicals for adding lustre and body to the material. A predetermined percentage of increase in weight is permissible. Above this percentage the material is rejected as below grade. It has been necessary for the manufacturer to weigh a piece of material before and after dipping it in the bath and calculate the increase percentage by dividing the initial weight into the final weight and subtracting 100. Thus, if the material weighed 5 pounds initially and 7.5 after the dipping operation, the percentage increase would be $$\frac{7.5}{5} \text{ or } 150\% - 100\% = 50\%.$$

This procedure obviously is tedious and time-consuming. Further, errors may easily creep in during calculations.

The same objections hold where percentage decrease is to be determined.

In order to overcome these objections, the present invention provides a mechanical system of calculating percentages. The initial weight being first determined, it is merely necessary for the operator to place the treated material on the scale and the indicator will show the percentage increase or decrease.

A more detailed explanation follows in connection with the drawings, wherein

Fig. 1 is a front view of one form of the percentage increase scale.

Fig. 2 is a detail of a chart which may be used in such a scale.

Figure 3:
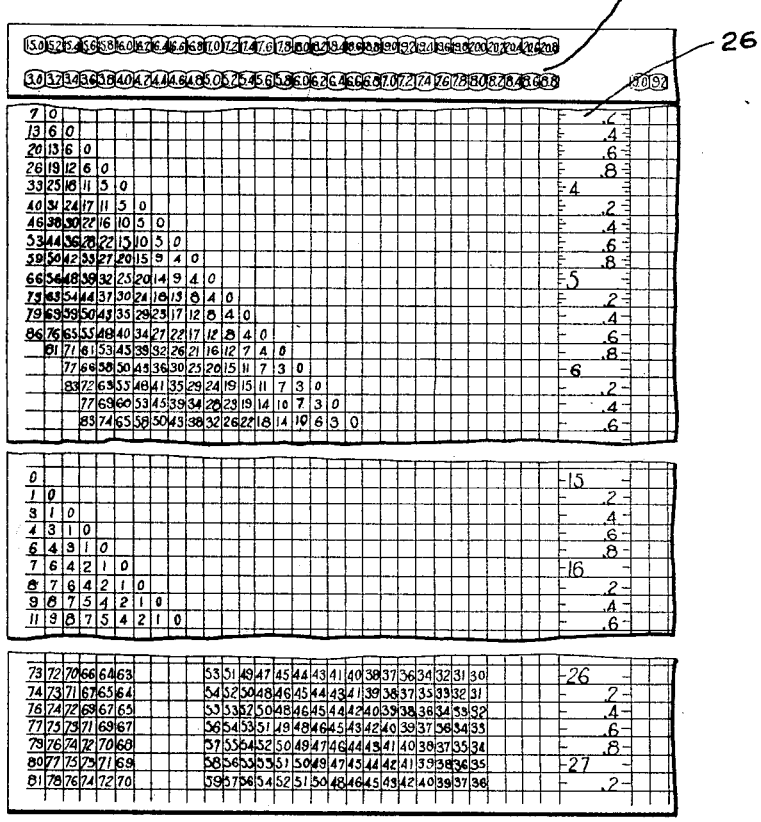
Fig. 3 is a detail of another form of chart which may be used in said scale.

Referring to Fig. 1, the base 10 of the scale contains the usual base lever or levers (not shown) actuated by a load on the platform 11 to lower the draft rod 12. The latter through well known mechanism rotates the drum chart 13 in proportion to the load. The face of the chart is visible through a sight opening 14 in the casing 15. A fixed indicator 16 is provided which determines the readings to be taken from the chart. In the embodiment of the invention shown in Figs. 1 and 2, a stationary percentage scale 17 is carried by the casing at the bottom of the sight opening.

The chart 13 is provided with a single vertical column 18 furnishing the weight of the load on the platform. Each number in column 18 is also in a horizontal row 19 of numbers representing the weight of the material before being dipped in the bath.

The manner in which the increase in percentage of weight of material is given by the scale may now be made clear. The untreated material is placed on the platform and the indicator 16 reads the weight in column 18. Assume the untreated material weighs 4 pounds. This weight is noted by the operator either by writing it on a tag and attaching the tag to the material or by some other equally simple method.

After treatment, the material is again placed on the platform. The indicator will be in line with one of the horizontal rows 19 of the chart. The operator runs his eye along the row in line with the indicator until he finds the number 4 in the row. This number is also in one of the vertical columns 20 parallel to column 18.

In line with each vertical column 20 is a number of the percentage scale. Having found the number 4 covered by the indicator, the operator need only go to the bottom of the column 20 in which the number is located to read the percentage increase in weight from scale 17.

Suppose, for example, the material after treatment weights 4.4 pounds. The indicator will be in line with the horizontal column 19 containing 4.4 in column 18 although this latter column should be disregarded by the operator upon the second weighing of the material. In this row 19, the operator finds 4.0 in line with 10 on the percentage scale 17. The percentage increase in weight is therefore 10%. This is correct as the increase in weight is 0.4 which is 10% of 4, the initial weight.

In Fig. 3, a different indicating structure is provided to furnish percentage increase in weight.

The fixed scale 25 in Fig. 3 contains two parallel rows of initial weights instead of percentages as in scale 17 of Figs. 1 and 2. The column 26 of the chart contains the actual weights of materials on the platform the same as aforementioned column 18. In line with each number in column 26 is a horizontal row of percentages.

The manner in which the embodiment of Fig. 3 is used will now be explained. The operator, as before, obtains the weight of material from vertical column 26. Assume the initial weight to be 6 pounds. After treatment, the material is again placed on the scale. The operator runs down the vertical column of the chart in line with "6" in scale 25 and where the indicator 16 crosses this column finds the percentage increase. Thus assume the material after treatment weighs 6.6 pounds. The indicator will be along the horizontal row including 6.6 of column 26. In this horizontal row, the indicator will show 10 in line with 6 of the scale 25. Thus the increase in weight is 10%.

Figure 4:
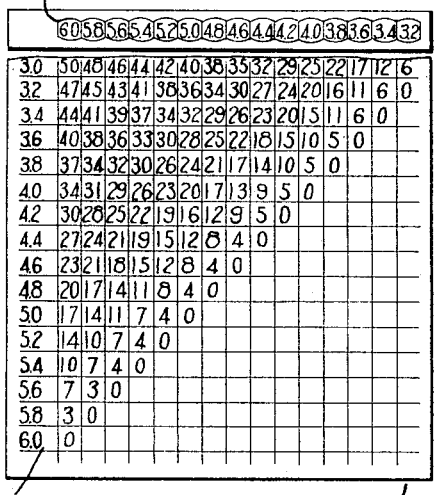
Fig. 4 is a detail of a chart which is used for giving percentages of decrease in weight.

In Fig. 4 is shown an embodiment of the invention for obtaining percentages decrease in weight.

Fixed scale 30 contains the initial weights. The vertical chart column 31 contains the actual weights. The percentages of decrease in weight are arranged in columns, each alined with one of the initial weight figures of scale column 30. After treatment, the material is placed on the platform and indicator 16 indicates the percentage decrease in the column alined with the initial weight. Thus, if the initial weight is 5.0, the various percentages decrease may be read in the column alined with 5.0 of scale 30.

While there has been shown and described the preferred embodiments of the invention, it will be understood that applicant desires to be limited only by the scope of the following claim.

I claim:

An automatic scale for obtaining percentage variations between two successive weighings of a load, comprising a chart automatically moved by the load to a position corresponding to the magnitude of the load, the chart containing parallel columns of initial weight figures, and also a column of actual weight figures, parallel with the column of initial weight figures, a fixed index extending across the chart, and a fixed scale of percentage figures extending parallel to the fixed index and having a percentage figure in line with and corresponding to each initial weight column, whereby the percentage variation is given by the figure in the fixed scale alined with the column containing the initial weight figure at the index line.

In testimony whereof I hereto affix my signature.

LE ROY S. SMITHERS.